(12) United States Patent
Xu et al.

(10) Patent No.: US 12,418,211 B2
(45) Date of Patent: Sep. 16, 2025

(54) HANDHELD POWER TOOL, TABLE TOOL, AND OUTDOOR TOOL

(71) Applicant: Nanjing Chervon Industry Co., Ltd., Nanjing (CN)

(72) Inventors: Qian Xu, Nanjing (CN); Dezhong Yang, Nanjing (CN); Chenglong Hu, Nanjing (CN); Han Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 227 days.

(21) Appl. No.: 18/078,472

(22) Filed: Dec. 9, 2022

(65) Prior Publication Data

US 2023/0208241 A1    Jun. 29, 2023

(30) Foreign Application Priority Data

Dec. 28, 2021   (CN) .......................... 202111630035.X
Sep. 21, 2022   (CN) .......................... 202222498842.7

(51) Int. Cl.
  *H02K 3/52*   (2006.01)
  *H02K 1/14*   (2006.01)
  *H02K 7/14*   (2006.01)

(52) U.S. Cl.
  CPC ............. *H02K 3/522* (2013.01); *H02K 1/148* (2013.01); *H02K 7/145* (2013.01)

(58) Field of Classification Search
  CPC ........ H02K 3/522; H02K 1/148; H02K 7/145; H02K 2203/09; H02K 3/325; B25F 1/00
  See application file for complete search history.

(56) References Cited

U.S. PATENT DOCUMENTS

| | | | |
|---|---|---|---|
| 10,328,566 B2 | 6/2019 | Crosby | |
| 2012/0293103 A1* | 11/2012 | Forster | H01R 12/718 318/503 |
| 2017/0063187 A1* | 3/2017 | Hao | H02K 21/14 |
| 2017/0101996 A1* | 4/2017 | Zhou | H02P 6/16 |
| 2017/0110945 A1* | 4/2017 | Crosby | H02K 11/33 |
| 2017/0353076 A1* | 12/2017 | Ito | H02K 3/522 |
| 2019/0044110 A1* | 2/2019 | Sheeks | H02K 5/20 |

(Continued)

FOREIGN PATENT DOCUMENTS

| | | |
|---|---|---|
| DE | 102013012659 A1 | 12/2022 |
| EP | 2330717 A2 | 6/2011 |

(Continued)

OTHER PUBLICATIONS

Extended search report from European application No. 22211541.2, dated May 31, 2023, 7 pp.

*Primary Examiner* — Thomas Truong
(74) *Attorney, Agent, or Firm* — Greenberg Traurig, LLP

(57) ABSTRACT

A handheld power tool includes a housing and an electric motor. The housing is formed with a grip for a user to hold. The electric motor is disposed in the housing and used for driving a functional accessory to implement a function of the handheld power tool, where output power of the electric motor is greater than or equal to 120 W and less than or equal to 4500 W. The electric motor includes at least a stator, a rotor, and multiple coil windings disposed on the stator. A cross-section of each of the multiple coil windings is non-circular, and a slot fill factor of the electric motor is greater than or equal to 40%.

15 Claims, 13 Drawing Sheets

(56) References Cited

U.S. PATENT DOCUMENTS

| | | | | |
|---|---|---|---|---|
| 2021/0197351 A1* | 7/2021 | Dittrich | .................. | H02K 17/16 |
| 2022/0060073 A1* | 2/2022 | Ganev | .................. | H02K 15/095 |
| 2023/0010726 A1* | 1/2023 | Inuzuka | ................... | H02K 3/34 |
| 2023/0402899 A1* | 12/2023 | Inui | ........................ | H02K 11/33 |
| 2024/0088730 A1* | 3/2024 | Kim | ........................ | H02K 1/278 |

FOREIGN PATENT DOCUMENTS

| | | |
|---|---|---|
| EP | 3496246 A1 | 6/2019 |
| JP | 2006158024 A * | 6/2006 |

\* cited by examiner

HANDHELD POWER TOOL, TABLE TOOL, AND OUTDOOR TOOL

RELATED APPLICATION INFORMATION

This application claims the benefit under 35 U.S.C. § 119(a) of Chinese Patent Application No. CN 202111630035.X, filed on Dec. 28, 2021, and Chinese Patent Application No. CN 202222498842.7, filed on Sep. 21, 2022, which applications are incorporated herein by reference in their entirety.

BACKGROUND

Coil windings of an electric motor currently applied to a power tool are mostly copper wires with circular cross-sections. When the preceding coil windings are wound on a stator core, on the one hand, a slot fill factor of the electric motor is relatively low due to the shape of the coil windings, affecting the overall efficiency of the electric motor. On the other hand, the electric motor in operation generates a large amount of heat, and a gap between coils reduces the thermal conductivity of the electric motor, affecting the heat dissipation effect of the electric motor.

SUMMARY

A handheld power tool includes a housing and an electric motor. The housing is formed with a grip for a user to hold. The electric motor is disposed in the housing and used for driving a functional accessory to implement a function of the handheld power tool, where output power of the electric motor is greater than or equal to 120 W and less than or equal to 4500 W. The electric motor includes at least a stator, a rotor, and multiple coil windings disposed on the stator. A cross-section of each of the multiple coil windings is non-circular, and a slot fill factor of the electric motor is greater than or equal to 40%.

In some examples, the stator includes a stator core formed by stacking multiple stator laminations and an insulating member disposed on the stator core; where each of the multiple coil windings is wound on the insulating member.

In some examples, an outer diameter of the multiple stator laminations is greater than or equal to 30 mm and less than or equal to 100 mm; and an inner diameter of the multiple stator laminations is greater than or equal to 10 mm and less than or equal to 60 mm.

In some examples, a stack length of the stator core is greater than or equal to 5 mm and less than or equal to 80 mm.

In some examples, the stator core is formed by joining multiple split cores into which the stator core is split in a circumferential direction of the stator core.

In some examples, the cross-section of each of the multiple coil windings includes a rectangle, an ellipse, or a gradient shape.

In some examples, a cross-sectional area of each of the multiple coil windings is configured to be less than or equal to 5 $mm^2$.

In some examples, a rotational speed of the electric motor is greater than or equal to 15000 rpm and less than or equal to 60000 rpm.

In some examples, output torque of the electric motor is greater than or equal to 0.1 N·m and less than or equal to 8 N·m.

In some examples, a high efficiency region of motor efficiency accounts for 20% or more, where the high efficiency region is a region in which the motor efficiency is greater than or equal to 80%.

In some examples, the electric motor includes a printed circuit board and a conductive assembly disposed on the printed circuit board, where the conductive assembly is used for achieving electrical connections between the multiple coil windings.

In some examples, the conductive assembly includes a conductive member and a copper foil, where the copper foil is disposed on the printed circuit board and the conductive member is connected in parallel to the copper foil.

In some examples, a sum of cross-sectional areas of the conductive member and the copper foil is Scu, and a sum of cross-sectional areas of coil windings soldered in correspondence with the conductive member and the copper foil is Sw, and Scu≥Sw.

In some examples, a thickness of the printed circuit board satisfies that 0.8 mm≤h≤5 mm.

In some examples, the electric motor is a brushless motor driven by a driver circuit to operate.

In some examples, the handheld power tool further includes a battery pack detachably connected to the housing, where a rated output voltage of the battery pack is greater than or equal to 12 V.

A handheld power tool includes a housing and an electric motor. The housing is formed with a grip for a user to hold. The electric motor is disposed in the housing and used for driving a functional accessory to implement a function of the handheld power tool, where output power of the electric motor is greater than or equal to 120 W and less than or equal to 4500 W. The electric motor includes at least a stator, a rotor, and multiple coil windings disposed on the stator. A cross-section of each of the multiple coil windings is non-circular.

In some examples, the cross-section of each of the multiple coil windings includes a rectangle, an ellipse, and a gradient shape.

In some examples, a slot fill factor of the electric motor is greater than or equal to 40%.

In some examples, a cross-sectional area of each of the multiple coil windings is configured to be less than or equal to 5 $mm^2$.

A table tool includes a table, a saw blade, and an electric motor. The table is provided with a workplane on which a workpiece is placed. The saw blade is used for acting on the workpiece. The electric motor is used for driving the saw blade to rotate, where the electric motor includes at least a stator, a rotor, and multiple coil windings disposed on the stator, and output power of the electric motor is greater than or equal to 500 W and less than or equal to 5000 W. A cross-section of each of the multiple coil windings is non-circular, and a slot fill factor of the electric motor is greater than or equal to 40%.

In some examples, the stator includes a stator core formed by stacking multiple stator laminations and an insulating member disposed on the stator core; and each of the multiple coil windings is wound on the insulating member.

In some examples, an outer diameter of the multiple stator laminations is greater than or equal to 40 mm and less than or equal to 120 mm; and an inner diameter of the multiple stator laminations is greater than or equal to 20 mm and less than or equal to 70 mm.

In some examples, a stack length of the stator core is greater than or equal to 30 mm and less than or equal to 120 mm.

In some examples, the stator core is formed by joining multiple split cores into which the stator core is split in a circumferential direction of the stator core.

In some examples, the cross-section of each of the multiple coil windings includes a rectangle, an ellipse, and a gradient shape.

In some examples, a cross-sectional area of each of the multiple coil windings is configured to be less than or equal to 5 mm$^2$.

In some examples, a rotational speed of the electric motor is greater than or equal to 15000 rpm and less than or equal to 60000 rpm.

In some examples, output torque of the electric motor is greater than or equal to 0.5 N·m and less than or equal to 10 N·m.

In some examples, a high efficiency region of motor efficiency accounts for 20% or more, where the high efficiency region is a region in which the motor efficiency is greater than or equal to 80%.

In some examples, the electric motor is a brushless motor driven by a driver circuit to operate.

In some examples, the table tool further includes a battery pack for supplying electrical energy, where a rated output voltage of the battery pack is greater than or equal to 18 V.

An outdoor tool includes a housing, a power output assembly, and an operating device. The power output assembly includes at least an electric motor. The operating device is used by an operator to control the outdoor tool. Output power of the electric motor is greater than or equal to 500 W and less than or equal to 5000 W. The electric motor includes at least a stator, a rotor, and multiple coil windings disposed on the stator. A cross-section of each of the multiple coil windings is non-circular, and a slot fill factor of the electric motor is greater than or equal to 40%.

In some examples, the stator includes a stator core formed by stacking multiple stator laminations and an insulating member disposed on the stator core; and each of the multiple coil windings is wound on the insulating member.

In some examples, an outer diameter of the multiple stator laminations is greater than or equal to 30 mm; and an inner diameter of the multiple stator laminations is greater than or equal to 10 mm.

In some examples, a stack length of the stator core is greater than or equal to 10 mm and less than or equal to 100 mm.

In some examples, the stator core is formed by joining multiple split cores into which the stator core is split in a circumferential direction of the stator core.

In some examples, the cross-section of each of the multiple coil windings includes a rectangle, an ellipse, and a gradient shape.

In some examples, a cross-sectional area of each of the multiple coil windings is set to be less than or equal to 5 mm$^2$.

In some examples, a rotational speed of the electric motor is greater than or equal to 2000 rpm and less than or equal to 100000 rpm.

In some examples, output torque of the electric motor is greater than or equal to 0.2 N·m and less than or equal to 20 N·m.

In some examples, a high efficiency region of motor efficiency accounts for 20% or more, where the high efficiency region is a region in which the motor efficiency is greater than or equal to 80%.

In some examples, the electric motor is a brushless motor driven by a driver circuit to operate.

In some examples, the outdoor tool further includes a battery pack, where a rated output voltage of the battery pack is greater than or equal to 18 V.

In the technical solutions of the present application, the brushless motor in which the cross-section of the coil winding is non-circular is applied to the handheld power tool, a table power tool, and the outdoor tool so that the slot fill factor of the brushless motor is improved, thereby improving the proportion of the high efficiency region of the motor efficiency and effectively suppressing the temperature rise while improving the working efficiency of the power tool.

DETAILED DESCRIPTION

The present application is described below in detail in conjunction with drawings and examples.

FIGS. 1 to 18 and 19 show examples of power tools in the present application, such as an electric drill, a table saw, and a smart mower. Actually, an electric motor in the present application is applicable to a handheld power tool such as an electric drill, an electric wrench, an electric screwdriver, an electric hammer drill, an electric circular saw, and a sander, a table tool such as a table saw, and an outdoor tool such as a mower, a snow thrower, a grass trimmer, a pair of electric shears, a pruner, and a chain saw. The following examples are part, not all, of examples of the present application.

Figure 1:
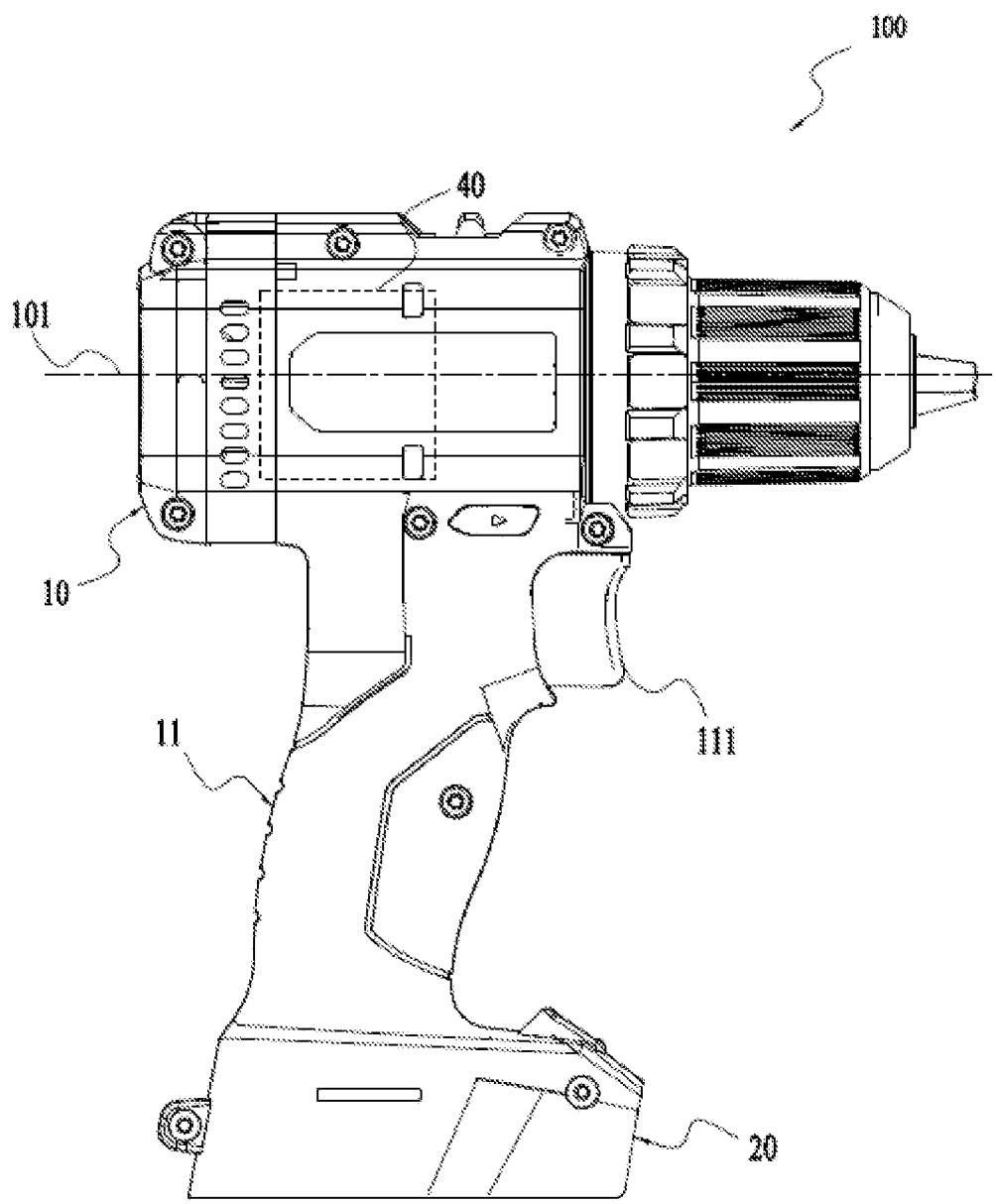
FIG. 1 is a perspective view of a handheld power tool as a first example of the present application.

FIG. 1 shows a handheld power tool as an example of the present application. The handheld power tool is particularly the electric drill. An electric drill 100 can provide at least torque to assist in driving a screw into a workpiece and may provide an impact force to perform an impact operation to satisfy usage requirements of a user.

Figure 2:
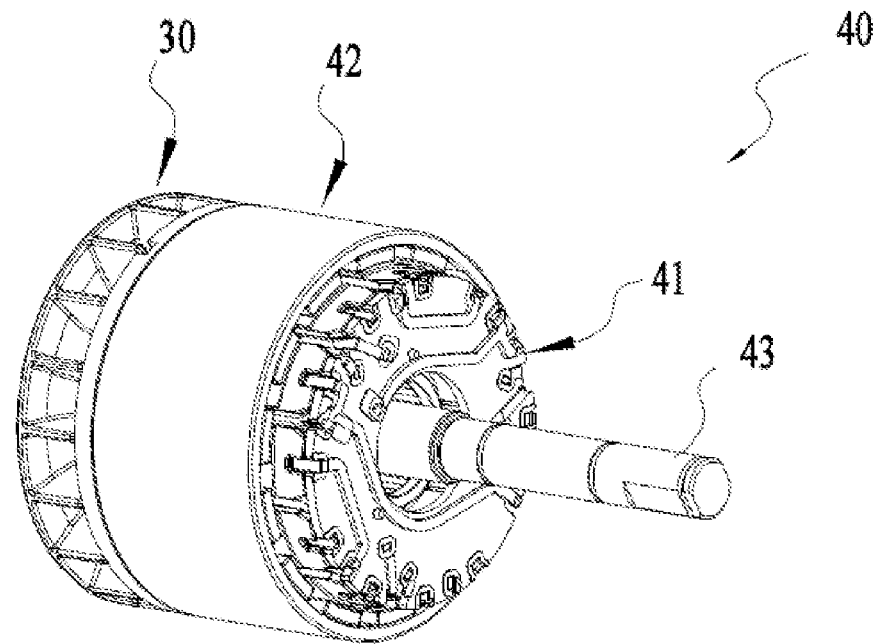
FIG. 2 is a perspective view of an outer rotor brushless motor according to the present application.

Referring to FIGS. 1 and 2, the electric drill 100 includes a housing 10 formed with a grip 11 for the user to hold. An end of the grip 11 is connected to a power supply interface for accessing a direct current power supply or an alternating current power supply. In some examples, the power supply interface is connected to a battery pack 200 detachably connected to the housing 10. Of course, the power supply interface may also access alternating current power, such as mains power. In this example, the battery pack 20 is used as an energy source for the electric drill 100. Specifically, a rated output voltage of the battery pack 20 is greater than or equal to 12 V. Further, a main control switch 111 is disposed on the grip 11 and used for controlling the start and stop of the electric drill 100. Of course, in some examples, the main control switch 111 can implement a speed regulation function, and the user controls a rotational speed of the electric drill 100 by controlling a stroke by which the main control switch 111 is pressed. An accommodation space is formed in the housing 10 along a direction of a first straight line 101, and a fan 30, an electric motor 40, and a transmission assembly are disposed in the accommodation space in sequence. The electric motor 40 is supported by the housing 10 and drives an output shaft to drive a drill bit to rotate. In this example, the electric motor 40 is configured to be a brushless motor, and the electric motor 40 is replaced with the brushless motor 40 in the following description.

Figure 3:
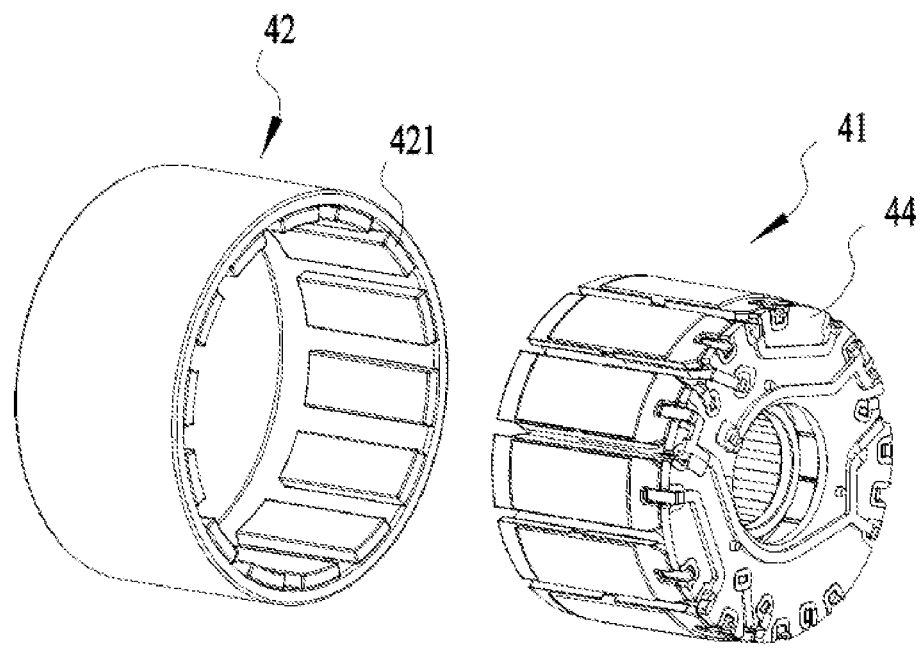
FIG. 3 is a partial exploded view of the brushless motor in FIG. 2.
Figure 4:
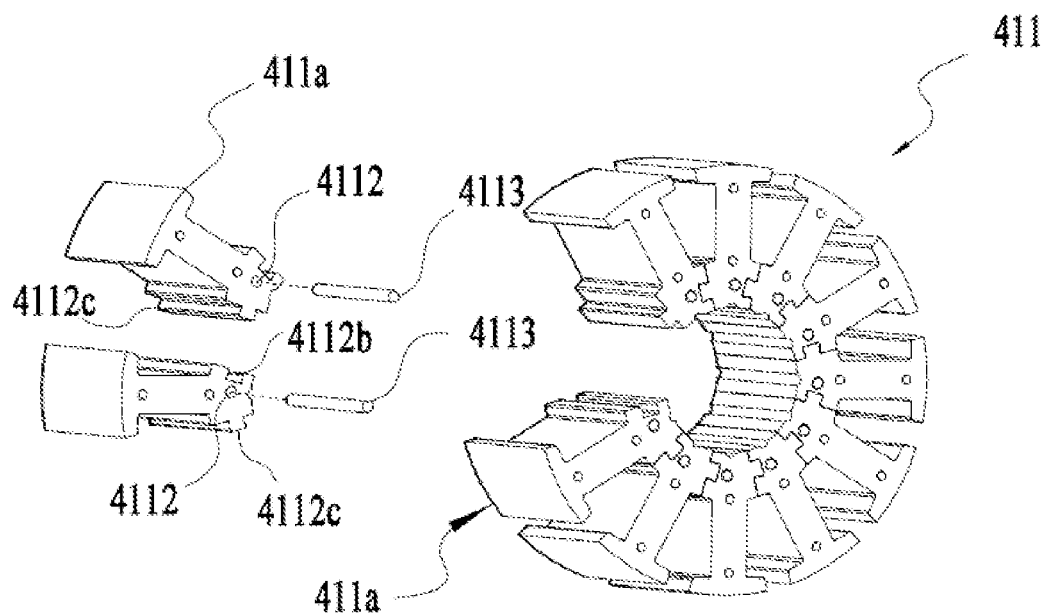
FIG. 4 is a partial exploded view of a stator core of the brushless motor in FIG. 2.

Referring to FIGS. 2 to 4, the brushless motor 40 in this example is configured to be an outer rotor brushless motor received in the housing 10 in a posture parallel to the first straight line 101. Specifically, the brushless motor 40 includes a stator 41, a rotor 42 disposed on an outer side of the stator 41, and an electric motor shaft 43. The stator 41 has a stator core 411, an insulating member 412 disposed on the stator core 411, and multiple coil windings 413 wound on the stator core 411 with insulating members 412 between the coil windings 413 and the stator core 411. The rotor 42 is disposed on an outer circumferential side of the stator 41. Specifically, multiple permanent magnets 421 are uniformly distributed on an inner side of the rotor 42.

In some examples, a structure of the stator core 411 is configured to be an integral structure. In another example, the structure of the stator core 411 is configured to be a split structure. In this example, the structure of the stator core 411 is configured to be the split structure. Specifically, the structure of the stator core 411 in this example is preferably configured to be a spliced structure. Next, the specific structure and splicing manner of the stator core 411 in this example are described.

In some examples, referring to FIG. 4, the stator core 411 is formed by joining multiple split cores 411a into which the stator core 411 is split in a circumferential direction of the stator core 411. The split core 411a is formed with a straight groove 4112b and a boss 4112c extending along a direction of the electric motor shaft 43. When the multiple split cores 411a are assembled into the stator core 411, the straight groove 4112b on each split core 411a forms a snap-fit structure with the boss 4112c of a split core 411a adjacent to the each split core 411a, thereby limiting the stator core 411 on a plane perpendicular to the electric motor shaft 43.

Figure 5:
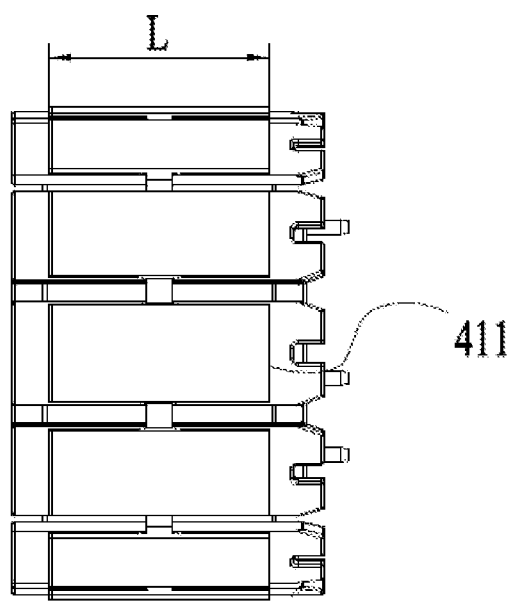
FIG. 5 is a perspective view of part of a structure of a brushless motor from another perspective.

In some examples, referring to FIG. 5, a stack length L of the stator core 411 is greater than or equal to 5 mm and less than or equal to 80 mm. In some examples, the stack length L of the stator core 411 is greater than or equal to 5 mm and less than or equal to 25 mm. In some examples, the stack length L of the stator core 411 is greater than or equal to 25 mm and less than or equal to 50 mm. In some examples, the stack length L of the stator core 411 is greater than or equal to 50 mm and less than or equal to 70 mm. In some examples, the stack length L of the stator core 411 is greater than or equal to 70 mm and less than or equal to 80 mm.

Figure 7:
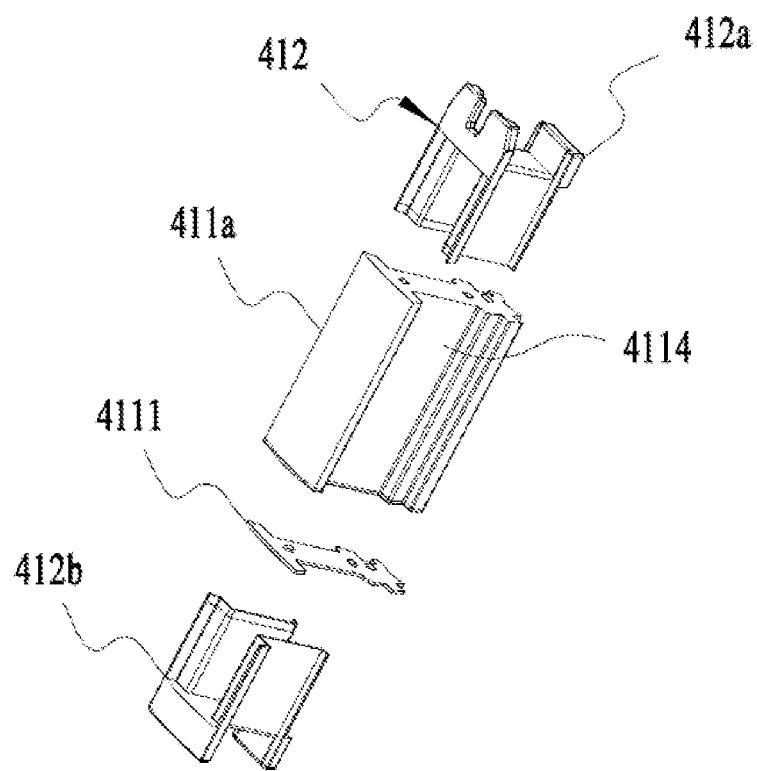
FIG. 7 is an exploded view of one split core of a stator core.

Referring to FIGS. 4 and 7, the stator core 411 is formed by stacking multiple stator laminations 4111 in a direction parallel to the electric motor shaft 43. The stator core 411 further includes fixing pins 4113 for fixing the multiple stator laminations 4111. The stator lamination 4111 is provided with a through hole 4112 through which the fixing pin 4113 can penetrate to fix the stator lamination 4111.

Figure 6:
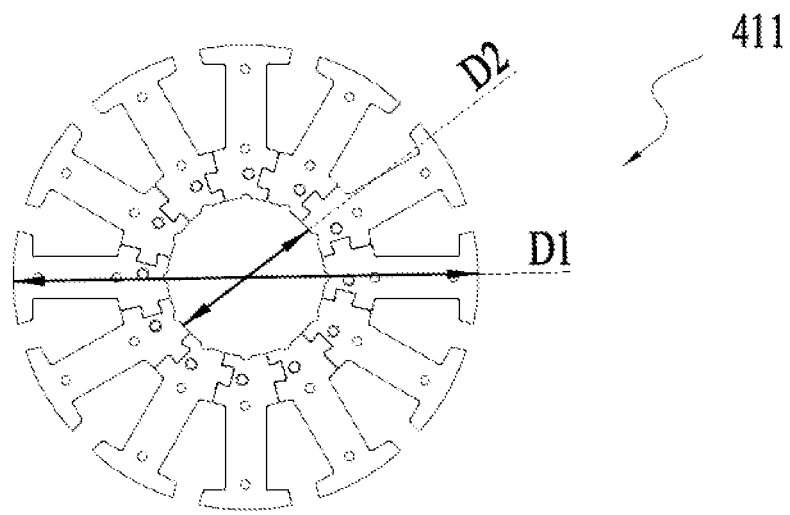
FIG. 6 is a perspective view of the stator core of the brushless motor in FIG. 4 from another perspective.

In some examples, referring to FIG. 6, an outer diameter D1 of the stator laminations 4111 is greater than or equal to 30 mm and less than or equal to 100 mm. In some examples, the outer diameter D1 of the stator laminations is greater than or equal to 30 mm and less than or equal to 50 mm. In some examples, the outer diameter D1 of the stator laminations is greater than or equal to 50 mm and less than or equal to 70 mm. In some examples, the outer diameter D1 of the stator laminations is greater than or equal to 70 mm and less than or equal to 100 mm. An inner diameter D2 of the stator laminations is greater than or equal to 10 mm and less than or equal to 60 mm. In some examples, the inner diameter D2 of the stator laminations is greater than or equal to 10 mm and less than or equal to 30 mm. In some examples, the inner diameter D2 of the stator laminations is greater than or equal to 30 mm and less than or equal to 60 mm.

Figure 8:
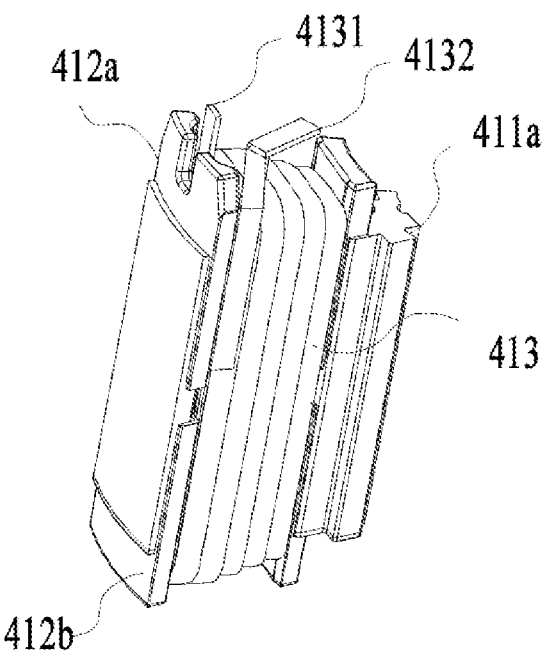
FIG. 8 is a perspective view of a split core on which a coil winding is wound.

Referring to FIGS. 7 and 8, the stator core 411 further includes multiple stator teeth 4114 extending circumferentially inwards, and the insulating members 412 are disposed on the multiple stator teeth 4114. Specifically, the insulating member 412 includes a front side insulator 412a and a rear side insulator 412b. Here, the coil winding 413 is wound on the stator tooth 4114 with the front side insulator 412a and the rear side insulator 412b between the coil winding 413 and the stator tooth 4114. Specifically, the front side insulator 412a is sleeved on a front side of the stator tooth 4114, and the rear side insulator 412b is sleeved on a rear side of the stator tooth 4114. The coil winding 413 is wound back and forth on the front side insulator 412a and the rear side insulator 412b, that is, the coil winding 413 is wound on the stator tooth 4114 with the front side insulator 412a and the rear side insulator 412b between the coil winding 413 and the stator tooth 4114.

Next, a shape of the coil winding 413 on the stator 41, a manner in which the coil winding 413 is wound on the stator 41, and a wiring manner are described in detail with reference to FIGS. 8 to 10.

In this example, a cross-section 413a of the coil winding 413 is non-circular. Specifically, the cross-section of the coil winding 413 may be configured to be one of or a combination of a rectangle, an ellipse, or a gradient shape. Preferably, in this example, the cross-section 413a of the coil winding 413 is a rectangle, and a cross-sectional area of the coil winding 413, that is, an area of the rectangle, is configured to be less than or equal to 5 mm$^2$. In some examples, the cross-sectional area 413a of the coil winding 413 is configured to be less than or equal to 3 mm$^2$. The cross-section 413a of the coil winding 413 is a cross section of one coil winding in a plane perpendicular to a current direction flowing through the one coil winding.

The multiple split cores 411a are assembled along the circumferential direction into the stator core 411, and a manner in which adjacent split cores 411a are mounted is described in detail above and is not repeated here. Referring to FIG. 8, one split core 411a is used as an example, and the coil winding 413 is wound on the stator tooth 4114 and formed with a wire inlet end 4131 and a wire outlet end 4132. In the assembly process of the stator 41, the coil winding 413 is wound on the stator tooth 4114 of each split core 411a, and then all the split cores 411a on which the coil windings 413 are wound are limited and fixed through the preceding snap-fit structures and assembled into the stator 41. Preferably, in this example, the brushless motor 40 is configured to be a three-phase brushless motor, and the stator core 411 is composed of 12 split cores 411a.

Figure 9:
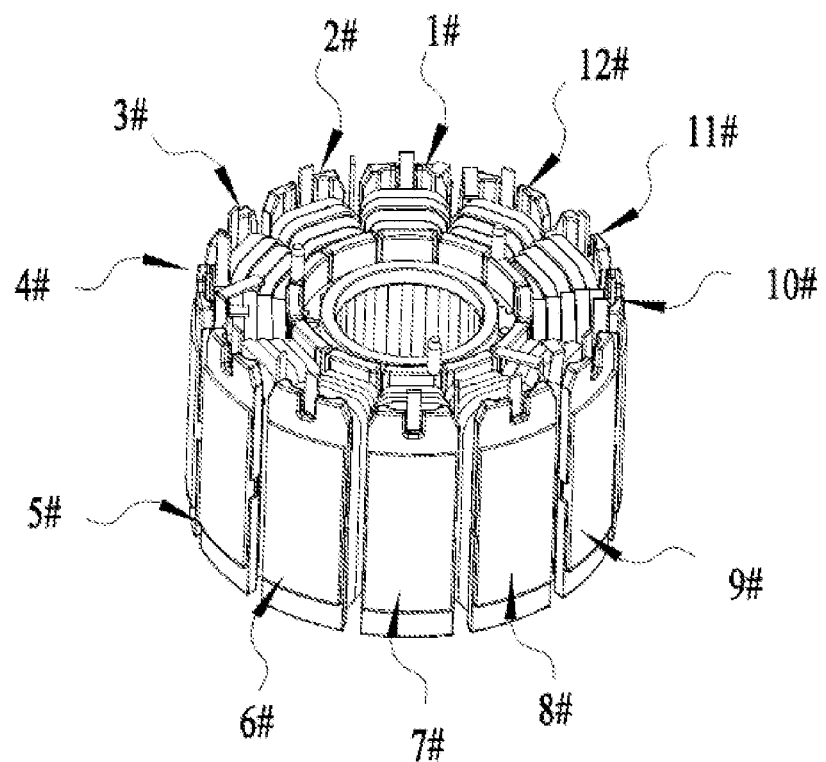
FIG. 9 is a perspective view of a stator core on which coil windings are wound.

FIG. 9 shows the stator core 411 on which the coil windings 413 are wound. The coil winding 413 wound on each split core 411a is formed with the wire inlet end 4131 and the wire outlet end 4132. If any split core 411a of the stator core 411 is defined as 1 #, the other split cores are defined as a split core 2 #, a split core 3 #, a split core 4 #, a split core 5 #, a split core 6 #, a split core 7 #, a split core 8 #, a split core 9 #, a split core 10 #, a split core 11 #, and a split core 12 # in sequence along a counterclockwise direction. The coil winding 413 is wound on each split core and each coil winding 413 is formed with the wire inlet end 4131 and the wire outlet end 4132. As an example, the split core 1 #, the split core 2 #, the split core 7 #, the split core 8 #, and the coil windings 413 wound on the split cores are used as one phase of the three-phase brushless motor 40. The split core 3 #, the split core 4 #, the split core 9 #, the split core 10 #, and the coil windings 413 wound on the split cores are used as one phase of the three-phase brushless motor 40. The split core 5 #, the split core 6 #, the split core 11 #, the split core 12 #, and the coil windings 413 wound on the split cores are used as one phase of the three-phase brushless motor 40. The three phases of the three-phase brushless motor 40 are formed by the preceding distribution method. Of course, those skilled in the art can adopt other numbers of split cores or other distribution methods for electrical connections, which is not limited in the present application.

Referring to FIG. 3, the three-phase brushless motor 40 further includes a printed circuit board 44. The printed circuit board 44 is fixedly disposed on a side of the stator 41 and used for implementing conductive connections between the coil windings 413 on the stator core 411 of the three-phase brushless motor 40.

One phase of the three-phase brushless motor 40 is used as an example. Referring to FIG. 10, the coil winding 413 on the split core 1 # enters at 1a, exits at 1b, is wound along an extension direction of the stator tooth 4114, enters at 2a, and exits at 2b to form a first layer of winding, and the coil winding 413 forms a second layer of winding according to this winding rule and finally exits at 3b to form a third layer of winding. Since a width of the stator tooth 4114 in the extension direction of the stator tooth 4114 is basically consistent, the space for placing the coil winding 413 and between two adjacent stator teeth 4114 gradually decreases in the extension direction of the stator tooth 4114. Thus, a length of the first layer of winding in the extension direction of the stator tooth 4114 is greater than a length of the second layer of winding in the extension direction of the stator tooth 4114. The length of the second layer of winding in the extension direction of the stator tooth 4114 is greater than a length of the third layer of winding in the extension direction of the stator tooth 4114.

In this example, the coil windings 413 are wound in the preceding winding manner, which can ensure that a slot fill factor of the brushless motor 40 is greater than or equal to 40%.

Figure 10:
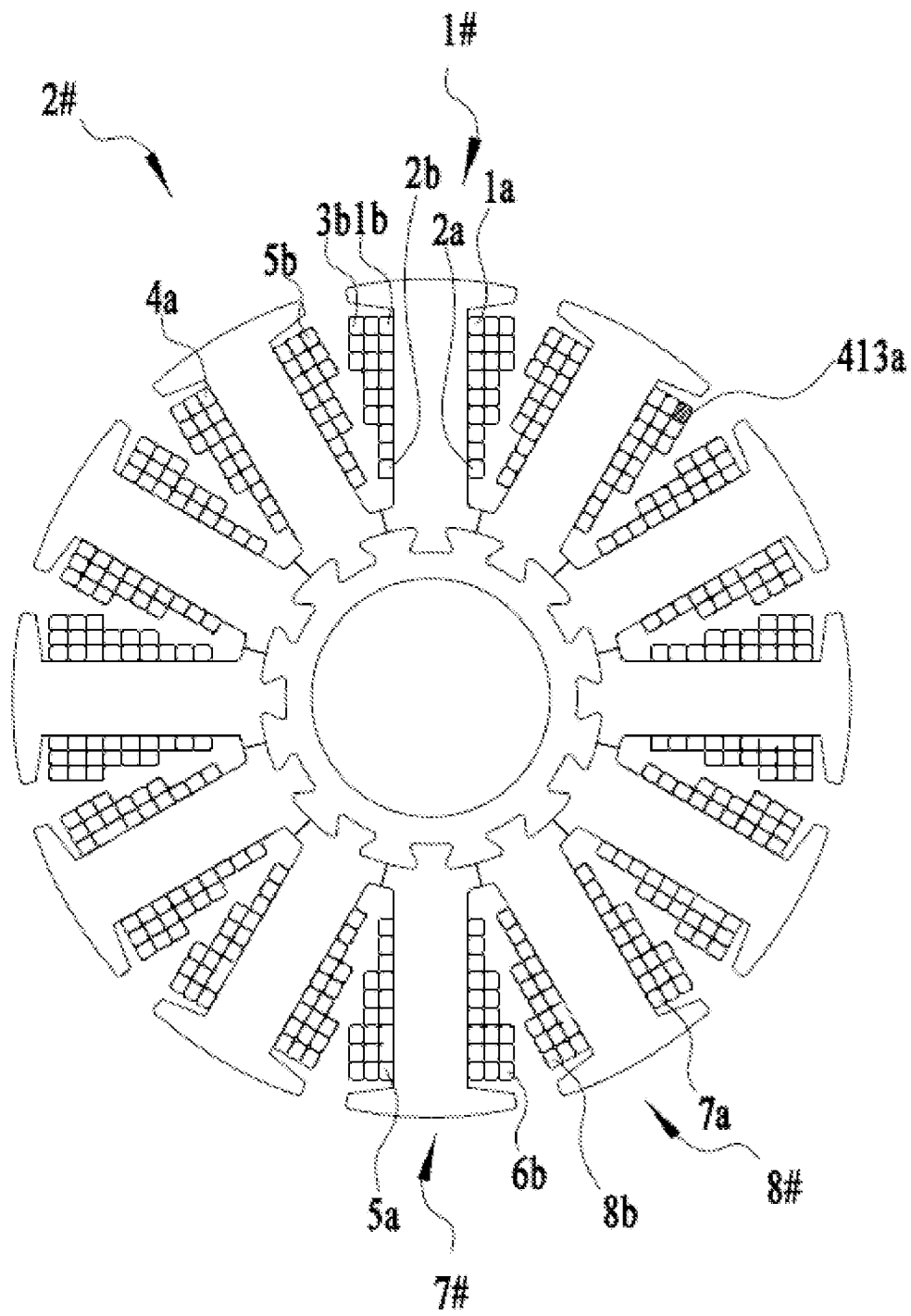
FIG. 10 is a cross-sectional view of the stator core in FIG. 9.

Specifically, referring to FIG. 10, the coil winding 413 on the split core 1 # has the wire inlet end 4131 at 1a and the wire outlet end 4132 at 3b. The coil winding 413 on the split core 2 # has the wire inlet end 4131 at 4a and the wire outlet end 4132 at 5b. A conductive connection is implemented between the wire outlet end 4132 at 3b of the coil winding 413 on the split core 1 # and the wire inlet end 4131 at 4a of the coil winding 413 on the split core 2 # through the printed circuit board 44. Similarly, the coil winding 413 on the split core 7 # has the wire inlet end 4131 at 5a and the wire outlet end 4132 at 6b. The coil winding 413 on the split core 8 # has the wire inlet end 4131 at 7a and the wire outlet end 4132 at 8b. A conductive connection is implemented between the wire outlet end 4132 at 6b of the coil winding 413 on the split core 7 # and the wire inlet end 4131 at 7a of the coil winding 413 on the split core 8 # through the printed circuit board 44. In some examples, a conductive connection is implemented between the wire outlet end 4132 at 5b of the coil winding 413 on the split core 2 # and the wire inlet end 4131 at 5a of the coil winding 413 on the split core 7 # through the printed circuit board 44. The preceding wiring manner is the wiring of one phase of the brushless motor 40. It is to be understood that the wiring manners for the other two phases are similar to the preceding wiring manner and are not repeated here.

Figure 11:
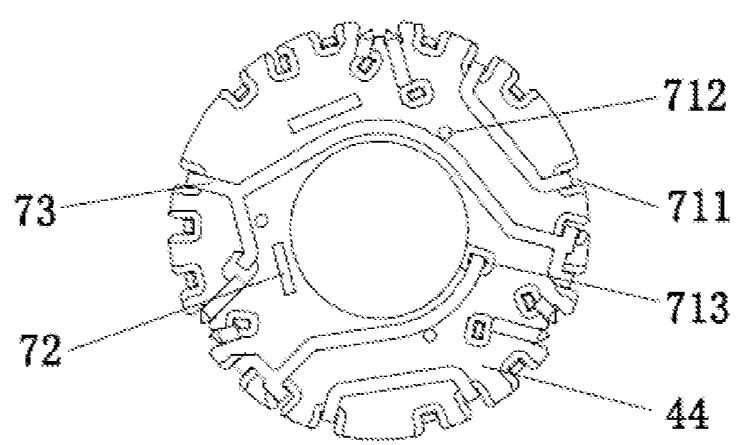
FIG. 11 is a perspective view of a printed circuit board on which a conductive assembly is disposed.

In some examples, a conductive assembly is arranged on the printed circuit board 44 and used for implementing electrical connections between the coil windings 413. Referring to FIG. 11, the conductive assembly includes a conductive member 73 and a copper foil 72. The copper foil 72 is disposed on the printed circuit board 44 and connected in parallel to the conductive member 73. The conductive member 73 and the copper foil 72 replace wires and connections of the coil windings 413 around an outer circumference of the stator core 411 in the related art, thereby effectively reducing the crossing between wires and simplifying connections. On the other hand, the following is avoided: lead-in wires and lead-out wires of multiple coil windings in a relevant structure are arranged along the direction of the electric motor shaft and occupy a relatively large space in height. The present application can effectively reduce the space occupied at an end of the electric motor, simplify wiring, and reduce the overall height of the electric motor, thereby improving the power density and connection efficiency of the electric motor. The conductive member 73 and the copper foil 72 are disposed on the printed circuit board 44 so that the structural connections are stable and reliable, and a risk and a cost are reduced. In some examples, the conductive member 73 and the copper foil 72 can be soldered to the coil windings 413.

In some examples, a sum of cross-sectional areas of the conductive member 73 and the copper foil 72 is Scu, and a sum of cross-sectional areas of coil windings 413 soldered in correspondence with the conductive member 73 and the copper foil 72 is Sw, and Scu≥Sw. When the coil windings 413 consists of multiple coils with the same cross-sectional area, Sw=N×S0. N denotes a number of wires of the coil windings 413 at a solder joint, in other words, N denotes the number of strands of the multiple coils. S0 denotes a cross-sectional area of a single wire of the coil windings 413. When the coil winding includes only one coil, N is 1. The cross-sectional areas of the conductive member 73 and the copper foil 72 are increased to be greater than the cross-sectional areas of the coil windings 413 soldered to the conductive member 73 and the copper foil 72, so as to ensure that a large current on the coil winding 413 can stably pass through the conductive member 73 and the copper foil 72. It is to be noted that the cross-sectional area refers to an area of a cross-section basically perpendicular to a flow direction of the current.

In some examples, the copper foil 72 and the conductive member 73 are connected to the winding on each tooth of the stator core 411, the coil windings 413 on teeth belonging to the same phase are connected in series and in parallel through the copper foil 72 and the conductive member 73, and then phases are connected in a delta shape, a Y shape, or other shapes, so as to form inlet and outlet wires of the electric motor. In the solution, for each phase of the electric motor, when the current is relatively large, the copper foil 72 and the conductive member 73 are not burned by the large current. In some examples, the electric motor is a three-phase electric motor.

In an example, multiple grooves 711 recessed radially inwards are arranged on an outer circumference of the printed circuit board 44, and the conductive member 73 extends into grooves 711 and is connected to the coil windings 413, so as to facilitate soldering of the coil windings 413.

Since copper has good electrical conductivity, in an example, the conductive member 73 is a strip of copper, thereby improving the electrical conductivity and the performance of the electric motor. In other examples, the conductive member 73 may be replaced with other conductive wires or metal stampings, so as to implementing the connections between the coil windings 413.

Figure 12:
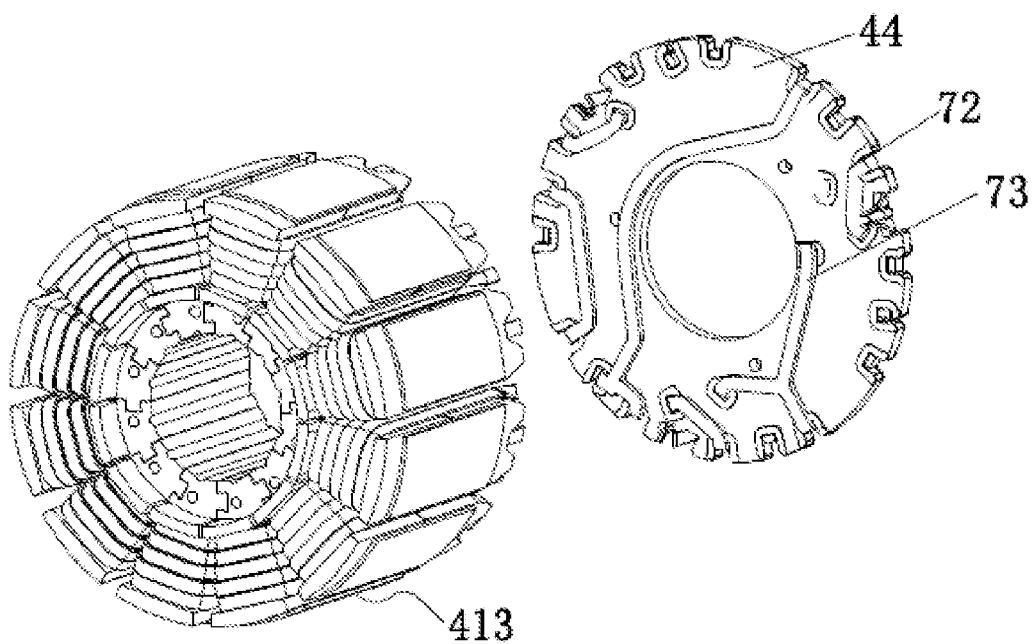
FIG. 12 is another perspective view of a printed circuit board on which a conductive assembly is disposed.

In an example, as shown in FIG. 12, when the number of the coil windings 413 is relatively large, resulting in a large number of solder joints, the conductive member 73 is soldered on an upper surface and a lower surface of the printed circuit board 44, so as to perform a double-sided arrangement, avoid overcrowding due to a single-sided arrangement, and facilitate a layout; when the number of the coil windings 413 is relatively small, in another example, the conductive member 73 is soldered on the upper surface or the lower surface of the printed circuit board 44, so as to perform the single-sided arrangement and simplify the structure. The conductive member 73 is specifically arranged according to actual situations, which is not limited.

In an example, a thickness of the printed circuit board 44 satisfies that 0.8 mm≤h≤5 mm, where the thickness refers to a thickness of the printed circuit board 44 itself, excluding thicknesses of the soldered conductive member 73 and solder joints, thereby avoiding the following case: the thickness of the printed circuit board 44 is so large that the electric motor is heightened, or the thickness of the printed circuit board 44 is so small that structural strength is affected. In this manner, reliability is ensured when the conductive member 73 is carried, and the layout of the conductive member 73 and the copper foil 72 is facilitated when multilayer wiring is adopted.

In some examples, as shown in FIG. 11, when the printed circuit board 44 is relatively thick, the multilayer wiring may be adopted, that is, the conductive member 73 is arranged on both the upper surface and the lower surface of the printed circuit board 44, and the copper foil 72 is arranged in an inner layer of the printed circuit board 44 through a processing process of the printed circuit board 44. In an example, the printed circuit board 44 is provided with a threading through hole 713 and the conductive member 73 penetrates through the threading through hole 713 so that the routing of the conductive member 73 on the upper surface and the lower surface is achieved, thereby reducing the number of conductive members 73 and the number of solder joints.

In an example, as shown in FIG. 11, multiple conductive members 73 are disposed on the printed circuit board 44 and insulation distances are provided between the multiple conductive members 73. A certain insulation distance needs to be ensured between conductive members 73, thereby avoiding an insulation failure in a severe working condition. For a magnitude of the insulation distance, reference is made to the related art and the details are not repeated here.

In consideration of a dimension of the electric motor, in an example, an outer diameter of the printed circuit board 44 is less than or equal to an outer diameter of the stator core 411, thereby reducing the space occupied by the printed circuit board 44 and facilitating installation.

In some examples, the printed circuit board 44 can be fixedly connected to an end of the stator core 411, and the printed circuit board 44 is fixed to the stator core 411 so that the structure is mounted stably.

In an example, as shown in FIG. 11, a first region and a second region are provided on the printed circuit board 44, the first region is covered with the copper foil 72, and the second region is provided with at least one heat dissipation hole 712, so as to achieve heat dissipation, improve safety, and extend a service life; the copper foil 72 and the heat dissipation hole 712 are disposed in different regions, so as to prevent the copper foil 72 from covering the heat dissipation hole 712. The first region and the second region are arranged according to actual situations, which is not limited. In some examples, the heat dissipation hole 712 and the threading through hole 713 are different and may be different in magnitude, shape, or the like, and a foolproof setting is performed so as to avoid a routing error of the conductive member 73.

The brushless motor 40 in the preceding examples is the outer rotor brushless motor, and the technical solution in the present application may also be applied to an inner rotor brushless motor. The specific structure of the inner rotor brushless motor is described below in conjunction with FIGS. 13 and 14.

Figure 13:
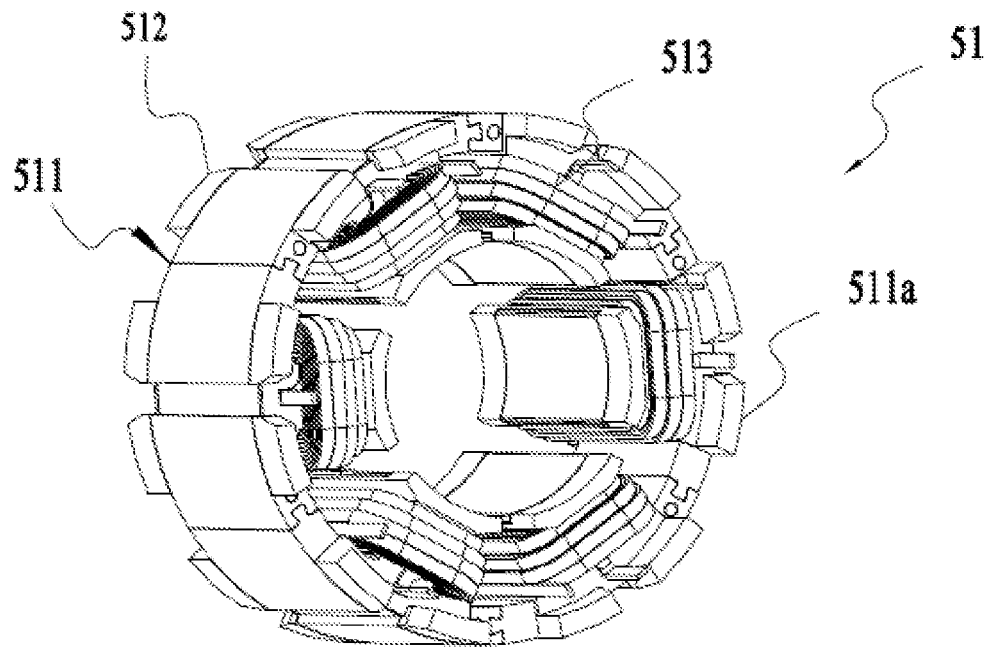
FIG. 13 is a perspective view of an inner rotor brushless motor according to the present application.

Referring to FIG. 13, the inner rotor brushless motor includes a stator 51, where the stator 51 includes a stator core 511, an insulating member 512 disposed on the stator core 511, and a coil winding 513 wound on the insulating member 512. The stator core 511 is formed by joining multiple split cores 511a into which the stator core 511 is split in a circumferential direction of the stator core 511. Specifically, the split core 511a is formed with a straight groove and a boss extending along a direction of an electric motor shaft. When the multiple split cores 511a are assembled into the stator core 511, the straight groove on each split core 511a forms a snap-fit structure with the boss of a split core 511a adjacent to the each split core 511a, thereby limiting the stator core 511 on a plane perpendicular to the electric motor shaft. The preceding limiting principle is similar to that of the brushless motor in the preceding example and is not repeated here.

Figure 14:
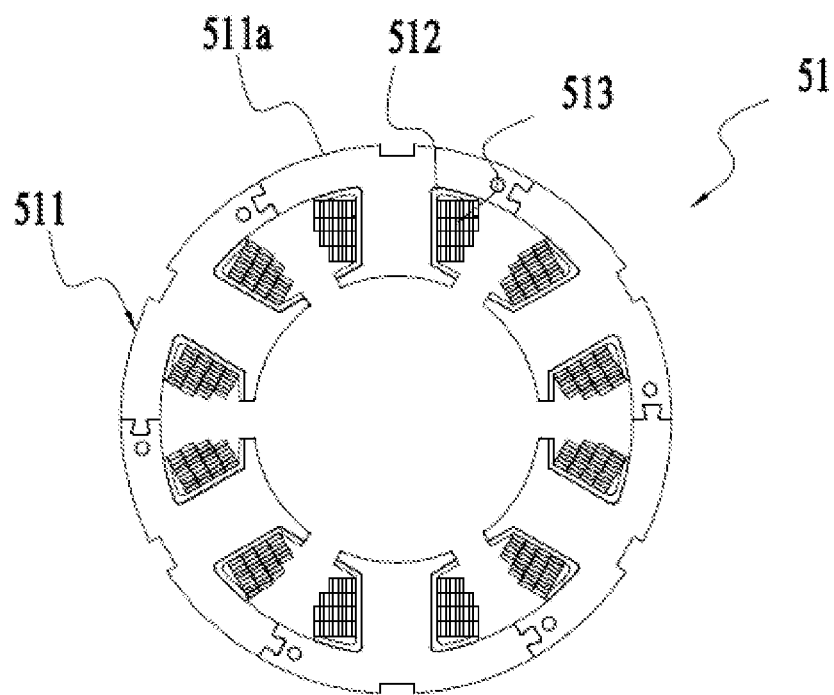
FIG. 14 is a perspective view of the inner rotor brushless motor in FIG. 13 from another perspective.

Referring to FIG. 14, the coil winding 513 is wound on the stator core 511 with the insulating member 512 between the coil winding 513 and the stator core 511. The coil winding 513 on the split core 511a is wound on the stator tooth along an extension direction of the stator tooth and forms a first layer of winding, and the coil winding 513 forms a second layer of winding according to this winding rule until the last layer of winding is formed. Since the width of the stator tooth in the extension direction of the stator tooth is basically consistent, the space for placing the coil winding 513 and between two adjacent stator teeth gradually decreases in the extension direction of the stator tooth. Thus, a length of the last layer of winding wound on the stator tooth along the extension direction of the stator tooth is the smallest. It is to be understood that a length of the first layer of winding along the extension direction of the stator tooth, a length of the second layer of winding along the extension direction of the stator tooth, until a length of the last layer of winding along the extension direction of the stator tooth gradually decrease.

In this example, a cross-section of the coil winding 513 is non-circular. Specifically, the cross-section of the coil winding 513 may be configured to be one of or a combination of a rectangle, an ellipse, or a gradient shape. In this example, the cross-section of the coil winding 513 is a rectangle, and a cross-sectional area of the coil winding 513, that is, an area of the rectangle, is configured to be less than or equal to 5 mm$^2$. In some examples, the cross-sectional area of the coil winding 513 is configured to be less than or equal to 3 mm$^2$.

Figure 15:
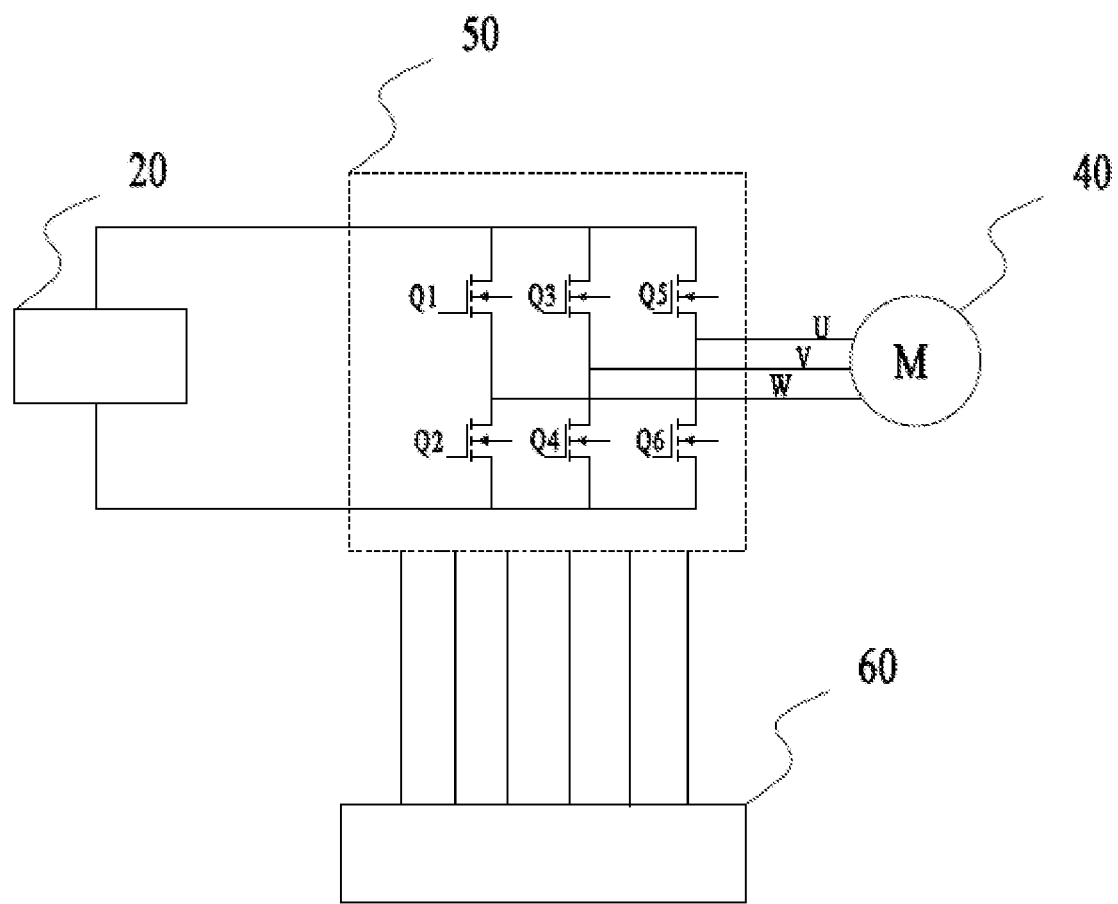
FIG. 15 is a diagram illustrating a control principle of a brushless motor.

Referring to FIG. 15, the electric drill 100 further includes a driver circuit 50 and a control module 60, which are used for controlling and driving the brushless motor 40 to operate. Driven by a drive signal outputted by the control module 60, the driver circuit 50 distributes a voltage to phases of windings on the stator 41 of the brushless motor 40 according to a certain logical relationship such that the brushless motor 40 starts and generates continuous torque. Specifically, the driver circuit 50 includes multiple electronic switches. In some examples, the electronic switches include field-effect transistors (FETs). In other examples, the electronic switches include insulated-gate bipolar transistors (IGBTs). In some examples, the driver circuit 50 is a three-phase bridge circuit. The driver circuit 50 includes three electronic switches Q1, Q3, and Q5 provided as high-side switches and three electronic switches Q2, Q4, and Q6 provided as low-side switches. The driver circuit 50 is a circuit that switches energized states of the phases of windings of the brushless motor 40 and controls energized currents of the phases of windings to drive the brushless motor 40 to rotate. The turn-on sequence and time of each phase of windings depend on a position of the rotor 42 of the brushless motor 40. To make the brushless motor 40 rotate, the driver circuit 50 has multiple driving states. In a driving state, stator windings of the electric motor 40 generate a magnetic field, and the control module 60 outputs a control signal based on different positions of the rotor to control the driver circuit 50 to switch between the driving states. Therefore, the magnetic field generated by the stator windings rotates to drive the rotor to rotate, thereby driving the brushless motor 40.

In some examples, output power of the brushless motor 40 using the preceding technical solution ranges from 120 W to 3000 W. In some examples, the output power of the brushless motor 40 ranges from 120 W to 500 W. In some examples, the output power of the brushless motor 40 ranges from 500 W to 1500 W. In some examples, the output power of the brushless motor 40 ranges from 1500 W to 2000 W. In some examples, the output power of the brushless motor 40 ranges from 2000 W to 2500 W. In some examples, the output power of the brushless motor 40 ranges from 2500 W to 3000 W.

In some examples, a rotational speed of the brushless motor 40 using the preceding technical solution ranges from 15000 rpm to 60000 rpm. In some examples, the rotational speed of the brushless motor 40 ranges from 15000 rpm to 20000 rpm. In some examples, the rotational speed of the brushless motor 40 ranges from 20000 rpm to 30000 rpm. In some examples, the rotational speed of the brushless motor 40 ranges from 30000 rpm to 40000 rpm. In some examples, the rotational speed of the brushless motor 40 ranges from 40000 rpm to 60000 rpm.

In some examples, output torque of the brushless motor 40 using the preceding technical solution ranges from 0.1 N·m to 8 N·m. In some examples, the output torque of the brushless motor 40 ranges from 0.1 N·m to 3 N·m. In some examples, the output torque of the brushless motor 40 ranges from 3 N·m to 5 N·m. In some examples, the output torque of the brushless motor 40 ranges from 5 N·m to 8 N·m.

In the preceding technical solution of the present application, the brushless motor in which the cross-section of the coil winding is non-circular is applied. Compared with a conventional electric motor in which a cross-section of a coil winding is circular, the brushless motor in the present application has a higher slot fill factor so that the proportion of a high efficiency region of the efficiency of the brushless motor is higher. Next, two brushless motors with the same volume are used as an example. It is assumed that one of the brushless motors is a common electric motor, that is, the cross-section of the coil winding is circular. The common electric motor is simply referred to as a round wire motor. It is assumed that the other brushless motor is the brushless motor provided in the present application, and the cross-section of the coil winding is a rectangle. An inner diameter of a copper wire in the coil winding of the round wire motor is set to 0.75 mm. A copper wire in the coil winding of a flat wire motor has a width of 1.4 mm and a thickness of 0.5 mm. In addition, the two brushless motors have the same number of winding turns of the coil winding on the stator core. Table 1 is an effect comparison table of the round wire motor and the flat wire motor.

TABLE 1

|  | Round Wire Motor | Flat Wire Motor |
| --- | --- | --- |
| Slot fill factor | 31.1% | 49.8% |
| Copper weight | 43.9 | 75.1 |
| Average temperature rise of the winding (° C.) | 147.0 | 101.5 |

As can be seen from Table 1, compared with the round wire motor with the same specification, the flat wire motor has a smaller gap and a larger contact area between coils due to the rectangular cross-section of the coil winding so that the thermal conductivity between the coil windings of the flat wire motor is better and the temperature rise of the electric motor can be effectively suppressed.

On the other hand, as can be seen from the test results, compared with the round wire motor with the same specification, the flat wire motor has a significantly higher slot fill factor than the round wire motor so that the flat wire motor has lower power consumption and higher working efficiency.

In this example, the high efficiency region of the motor efficiency of the brushless motor with a rectangular cross-section of the coil winding accounts for 20% or more. The high efficiency region of the brushless motor is a region in which the motor efficiency is greater than or equal to 80%.

Figure 16:
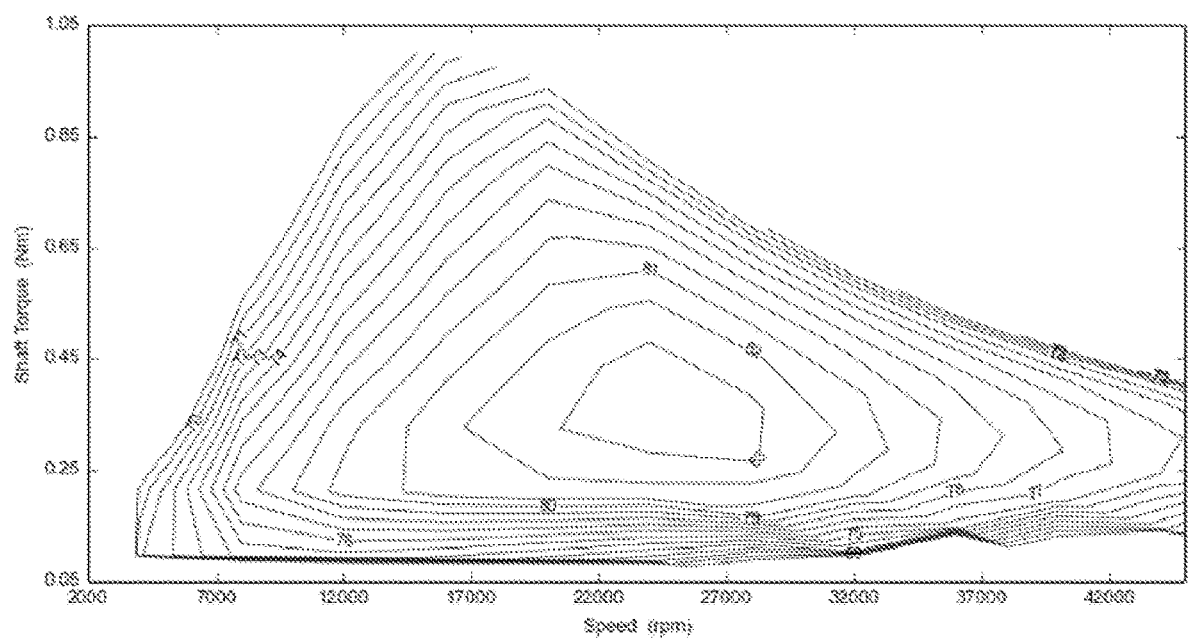
FIG. 16 is a motor efficiency map of a round wire motor.
Figure 17:
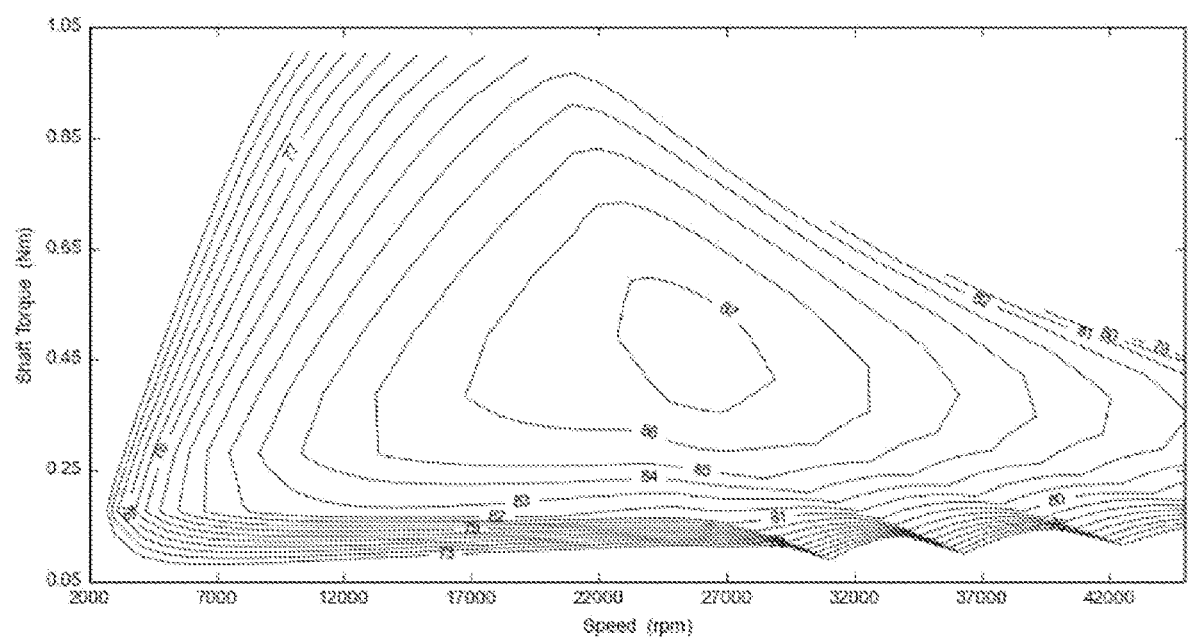
FIG. 17 is a motor efficiency map of a flat wire motor.

FIGS. 16 and 17 show the motor efficiency maps of the round wire motor and the flat wire motor, respectively. The round wire motor and the flat wire motor have basically the same specifications. The round wire motor and the flat wire motor with the specifications that the outer diameter of the stator laminations is 48 mm and the stack length of the stator core is 20 mm are used as an example. An area of the high efficiency region of the flat wire motor is significantly greater than an area of the high efficiency region of the round wire motor. In the test, a ratio of the area of the high efficiency region in which the efficiency of the flat wire motor is greater than 83% to the area of the high efficiency region in which the efficiency of the round wire motor is greater than 83% is greater than or equal to 7. It is to be understood that the high efficiency region of the motor efficiency of the flat wire motor is increased by a factor of 7 relative to that of the round wire motor. Thus, the flat wire motor has a larger high efficiency region than the round wire motor. Therefore, the flat wire motor provided in the present application can improve the working efficiency of the power tool when applied to the power tool.

That the coil winding with a non-circular cross-section is applied to the brushless motor and the preceding brushless motor is applied to the power tool to improve the working efficiency of the power tool is described in detail in the preceding examples. On the one hand, the cross-section of the coil winding of the brushless motor is configured to be non-circular so that the gap between coils becomes smaller and the contact area between coils becomes larger. In this manner, the thermal conductivity of the brushless motor is better and the temperature rise of the brushless motor can be effectively suppressed. On the other hand, the brushless motor in the present application has a higher slot fill factor so that the proportion of the high efficiency region of the motor efficiency of the brushless motor in the present application is higher, and the brushless motor can improve the working efficiency of the whole machine when applied to the power tool.

Figure 18:
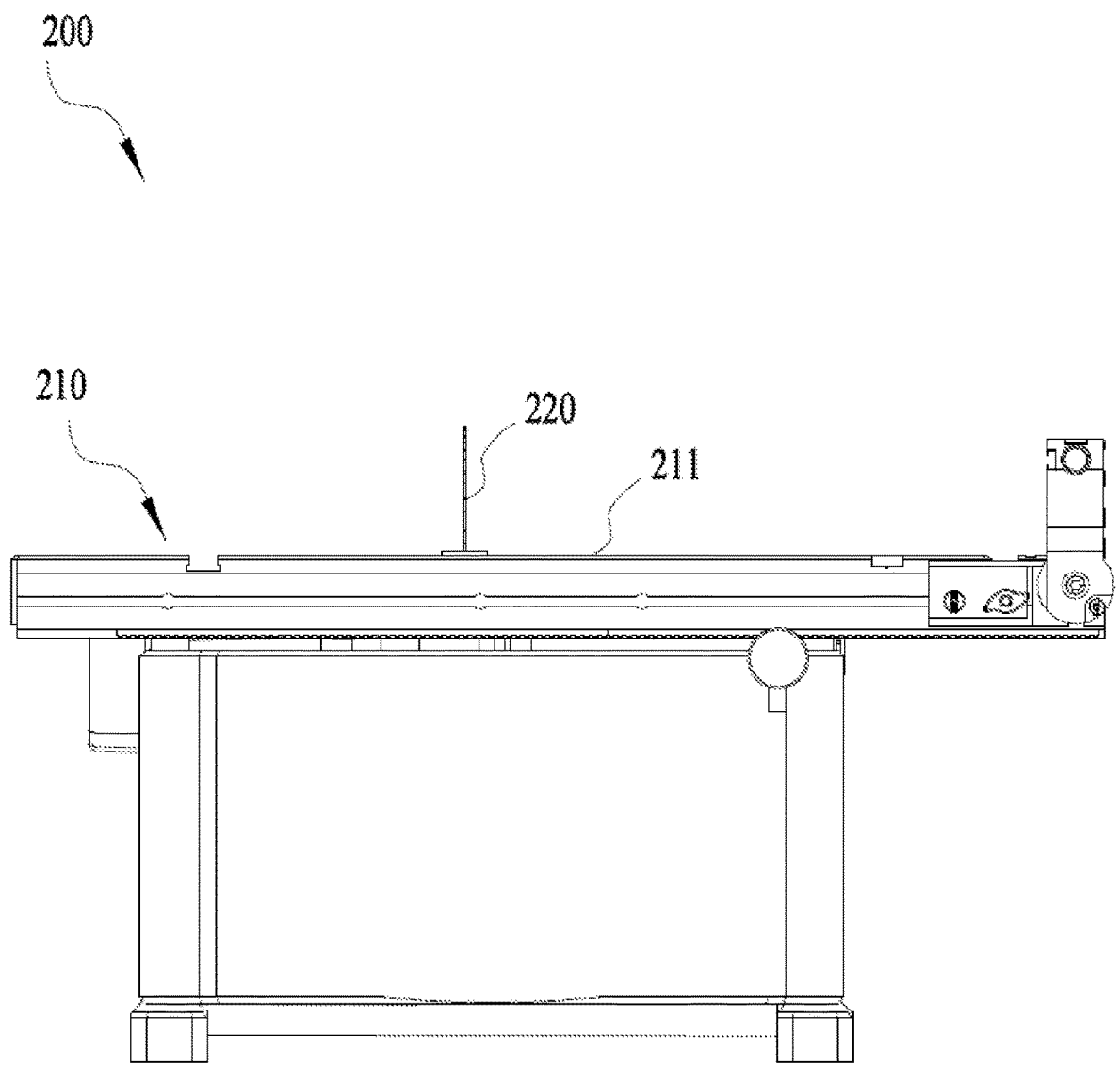
FIG. 18 is a perspective view of a table tool as another example of the present application.

In fact, the technical solution of the present application with respect to the brushless motor can also be applied to other types of power tool. FIG. 18 shows a second example of the power tool of the present application. The power tool is a table tool, in particular, a table saw 200. The table saw 200 includes a table 210 with a workplane 211 on which a workpiece can be placed. Specifically, the workplane 211 is an upper surface of the table 210 and for a user to perform a cutting operation on. A hole is formed on the workplane 211. The table saw 200 further includes a saw blade 220 for cutting the workpiece. The saw blade 220 passes through the hole and extends. The table saw 200 further includes an electric motor for supplying power, and the saw blade 220 is driven by the electric motor disposed below the workplane 211 to rotate to implement a cutting function. The saw blade 220 is used for cutting the workpiece pushed along the workplane 211 and in contact with the saw blade 220, such as wood. Specifically, the electric motor is preferably configured to be a brushless motor. In some examples, the table saw 200 further includes a power supply device electrically connected to the table saw 200 to supply electrical energy to the table saw 200. The power supply device may be a battery pack or a mains connector. In this example, preferably, the power supply device is configured to be the battery pack, where the battery pack is detachably connected to the table saw 200. Specifically, a rated output voltage of the battery pack is greater than or equal to 18 V.

The electric motor in this example is similar in structure to the brushless motor in the first example and is not described in detail here. It is to be noted that the cross-section of the coil winding of the brushless motor is a rectangle, and the cross-sectional area of the coil winding, that is, the area of the rectangle, is configured to be less than or equal to 5 $mm^2$. In some examples, the cross-sectional area of the coil winding is configured to be less than or equal to 3 $mm^2$.

Specifically, the stack length of the stator core of the brushless motor is greater than or equal to 30 mm and less than or equal to 120 mm. In some examples, the stack length of the stator core is greater than or equal to 30 mm and less than or equal to 50 mm. In some examples, the stack length of the stator core is greater than or equal to 50 mm and less than or equal to 70 mm. In some examples, the stack length of the stator core is greater than or equal to 70 mm and less than or equal to 90 mm. In some examples, the stack length of the stator core is greater than or equal to 90 mm and less than or equal to 120 mm. The outer diameter of the stator laminations is greater than or equal to 40 mm and less than or equal to 120 mm. In some examples, the outer diameter of the stator laminations is greater than or equal to 40 mm and less than or equal to 60 mm. In some examples, the outer diameter of the stator laminations is greater than or equal to 60 mm and less than or equal to 80 mm. In some examples, the outer diameter of the stator laminations is greater than or equal to 80 mm and less than or equal to 100 mm. In some examples, the outer diameter of the stator laminations is greater than or equal to 100 mm and less than or equal to 120 mm. The inner diameter of the stator laminations is greater than or equal to 20 mm and less than or equal to 70 mm. In some examples, the inner diameter of the stator laminations is greater than or equal to 20 mm and less than or equal to 40 mm. In some examples, the inner diameter of the stator laminations is greater than or equal to 40 mm and less than or equal to 70 mm.

Specifically, the output power of the brushless motor using the preceding technical solution ranges from 500 W to 5000 W. In some examples, the output power of the brushless motor ranges from 500 W to 1500 W. In some examples, the output power of the brushless motor ranges from 1500 W to 3000 W. In some examples, the output power of the brushless motor ranges from 3000 W to 5000 W. In some examples, the rotational speed of the brushless motor ranges from 15000 rpm to 60000 rpm. In some examples, the rotational speed of the brushless motor ranges from 15000 rpm to 20000 rpm. In some examples, the rotational speed of the brushless motor ranges from 20000 rpm to 30000 rpm. In some examples, the rotational speed of the brushless motor ranges from 30000 rpm to 40000 rpm. In some examples, the rotational speed of the brushless motor ranges from 40000 rpm to 60000 rpm. In some examples, the output torque of the brushless motor ranges from 0.5 N·m to 10 N·m. In some examples, the output torque of the brushless motor ranges from 0.5 N·m to 2 N·m. In some examples, the output torque of the brushless motor ranges from 2 N·m to 5 N·m. In some examples, the output torque of the brushless motor ranges from 5 N·m to 8 N·m. In some examples, the output torque of the brushless motor ranges from 8 N·m to 10 N·m.

In this example, the high efficiency region of the motor efficiency of the brushless motor using the preceding technical solution accounts for 20% or more. The high efficiency region of the brushless motor is a region in which the motor efficiency is greater than or equal to 80%.

Figure 19:
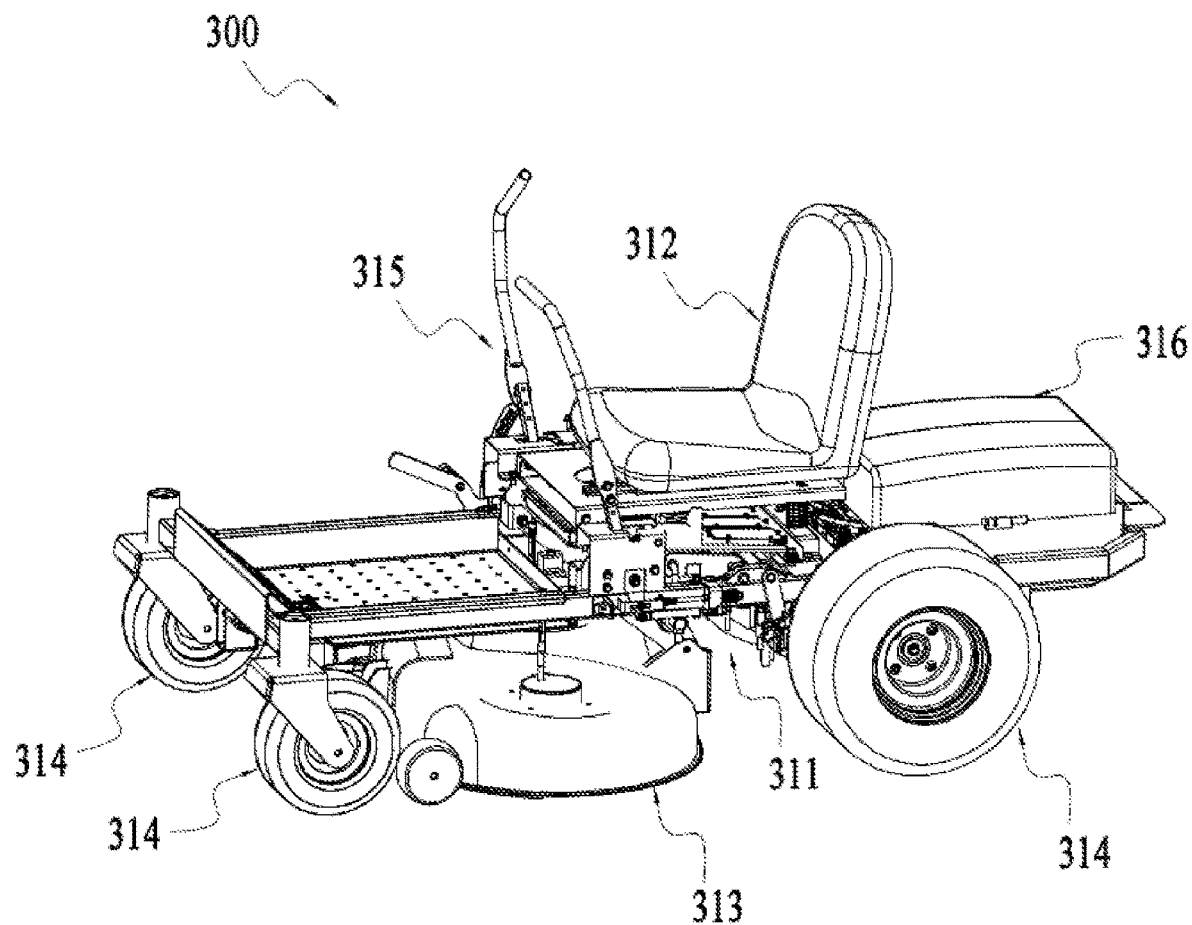
FIG. 19 is a perspective view of an outdoor tool as another example of the present application.

In fact, the technical solution of the present application with respect to the brushless motor can also be applied to other types of power tool. FIG. 19 shows a third example of the power tool of the present application. The power tool is an outdoor tool, in particular, a riding mower 300. Specifically, the riding mower 300 includes a rack 311, a seat 312, a power output assembly 313, a moving assembly 314, an operating device 315, and a power supply device 316.

The rack 311 is used for carrying the seat 312 and at least partially extends in a front and rear direction. The seat 312 is used for an operator to sit on and is mounted to the rack 311.

The power output assembly 313 includes a first electric motor for driving a mowing element to rotate at a high speed and a second electric motor for driving the moving assembly 314 to move. The power supply device 316 is used for powering the first electric motor, the second electric motor, and other electronic assemblies on the riding mower 300.

In some examples, the power supply device 316 is disposed on a rear side of the seat 312 on the rack 311. In some examples, the power supply device 316 includes multiple battery packs for supplying power to the power tool. In this example, preferably, a rated output voltage of the battery pack is configured to be greater than or equal to 18 V.

The operating device 315 is used by the operator to control the riding mower 300 to move and/or determine whether the riding mower 300 enters a working state.

In this example, preferably, the first electric motor or the second electric motor is configured to be a brushless motor and is similar in structure to the brushless motor in the first example, which is not described in detail here. It is to be noted that, in this example, the cross-section of the coil winding of the brushless motor is a rectangle, and the cross-sectional area of the coil winding, that is, the area of the rectangle, is configured to be less than or equal to 5 mm². In some examples, the cross-sectional area of the coil winding is configured to be less than or equal to 3 mm².

Specifically, the stack length of the stator core of the brushless motor is greater than or equal to 10 mm and less than or equal to 100 mm. In some examples, the stack length of the stator core is greater than or equal to 10 mm and less than or equal to 30 mm. In some examples, the stack length of the stator core is greater than or equal to 30 mm and less than or equal to 50 mm. In some examples, the stack length of the stator core is greater than or equal to 50 mm and less than or equal to 70 mm. In some examples, the stack length of the stator core is greater than or equal to 70 mm and less than or equal to 100 mm. The outer diameter of the stator laminations is greater than or equal to 30 mm and less than or equal to 120 mm. In some examples, the outer diameter of the stator laminations is greater than or equal to 30 mm and less than or equal to 60 mm. In some examples, the outer diameter of the stator laminations is greater than or equal to 60 mm and less than or equal to 80 mm. In some examples, the outer diameter of the stator laminations is greater than or equal to 80 mm and less than or equal to 100 mm. In some examples, the outer diameter of the stator laminations is greater than or equal to 100 mm and less than or equal to 120 mm. The inner diameter of the stator laminations is greater than or equal to 10 mm and less than or equal to 110 mm. In some examples, the inner diameter of the stator laminations is greater than or equal to 10 mm and less than or equal to 40 mm. In some examples, the inner diameter of the stator laminations is greater than or equal to 40 mm and less than or equal to 70 mm. In some examples, the inner diameter of the stator laminations is greater than or equal to 70 mm and less than or equal to 110 mm.

Specifically, the output power of the brushless motor using the preceding technical solution ranges from 500 W to 5000 W. In some examples, the output power of the brushless motor ranges from 500 W to 1500 W. In some examples, the output power of the brushless motor ranges from 1500 W to 3000 W. In some examples, the output power of the brushless motor ranges from 3000 W to 5000 W. In some examples, the rotational speed of the brushless motor ranges from 15000 rpm to 60000 rpm. In some examples, the rotational speed of the brushless motor ranges from 2000 rpm to 100000 rpm. In some examples, the rotational speed of the brushless motor ranges from 20000 rpm to 40000 rpm. In some examples, the rotational speed of the brushless motor ranges from 40000 rpm to 60000 rpm. In some examples, the rotational speed of the brushless motor ranges from 60000 rpm to 80000 rpm. In some examples, the rotational speed of the brushless motor ranges from 80000 rpm to 100000 rpm. In some examples, the output torque of the brushless motor ranges from 0.2 N·m to 20 N·m. In some examples, the output torque of the brushless motor ranges from 0.2 N·m to 5 N·m. In some examples, the output torque of the brushless motor ranges from 5 N·m to 15 N·m. In some examples, the output torque of the brushless motor ranges from 15 N·m to 20 N·m.

In this manner, the high efficiency region of the motor efficiency of the brushless motor using the preceding technical solution accounts for 20% or more. The high efficiency region of the brushless motor is a region in which the motor efficiency is greater than or equal to 80%.

The above illustrates and describes basic principles, main features, and advantages of the present application. It is to be understood by those skilled in the art that the preceding examples do not limit the present application in any form, and all technical solutions obtained by means of equivalent substitutions or equivalent transformations fall within the scope of the present application.

What is claimed is:

1. A handheld power tool, comprising:
a housing formed with a grip for a user to hold;
an electric motor disposed in the housing; and
a printed circuit board and a conductive assembly disposed on the printed circuit board,
wherein output power of the electric motor is greater than or equal to 120 W and less than or equal to 4500 W, the electric motor comprises at least a stator, a rotor, and a plurality of coil windings disposed on the stator, and
wherein the conductive assembly is used for achieving electrical connections between the plurality of coil windings and comprises a conductive member and a copper foil, the copper foil is disposed on the printed circuit board, the conductive member is connected in parallel to the copper foil, and a sum of cross-sectional areas of the conductive member and the copper foil is Scu and a sum of cross-sectional areas of coil windings soldered in correspondence with the conductive member and the copper foil is Sw, and Scu≥Sw.

2. The handheld power tool of claim 1, wherein the stator comprises a stator core formed by stacking a plurality of stator laminations and an insulating member disposed on the stator core, and each of the plurality of coil windings is wound on the insulating member.

3. The handheld power tool of claim 2, wherein an outer diameter of the plurality of stator laminations is greater than or equal to 30 mm and less than or equal to 100 mm and an inner diameter of the plurality of stator laminations is greater than or equal to 10 mm and less than or equal to 60 mm.

4. The handheld power tool of claim 2, wherein a stack length of the stator core is greater than or equal to 5 mm and less than or equal to 80 mm.

5. The handheld power tool of claim 2, wherein the stator core is formed by joining a plurality of split cores into which the stator core is split in a circumferential direction of the stator core.

6. The handheld power tool of claim 1, wherein the cross-section of each of the plurality of coil windings comprises a rectangle, an ellipse, or a gradient shape.

7. The handheld power tool of claim 6, wherein a cross-sectional area of each of the plurality of coil windings is configured to be less than or equal to 5 mm2.

8. The handheld power tool of claim 1, wherein a rotational speed of the electric motor is greater than or equal to 15000 rpm and less than or equal to 60000 rpm.

9. The handheld power tool of claim 1, wherein output torque of the electric motor is greater than or equal to 0.1 N·m and less than or equal to 8 N·m.

10. The handheld power tool of claim 1, wherein the electric motor is a flat wire electric motor with non-circular cross-sectional coil windings and in a motor efficiency map of the electric motor, a high efficiency region of motor efficiency accounts for 20% or more, and the high efficiency region is a region in which the motor efficiency is greater than or equal to 80%.

11. The handheld power tool of claim 1, wherein a thickness of the printed circuit board satisfies that $0.8 \text{ mm} \leq h \leq 5 \text{ mm}$.

12. The handheld power tool of claim 1, wherein the electric motor is a brushless motor driven by a driver circuit to operate.

13. A handheld power tool, comprising:
a housing formed with a grip for a user to hold; and
a flat wire electric motor disposed in the housing and used for driving a functional accessory to implement a function of the handheld power tool,
wherein output power of the electric motor is greater than or equal to 120 W and less than or equal to 4500 W, the electric motor comprises at least a stator, a rotor, and a plurality of coil windings disposed on the stator, and a cross-section of each of the plurality of coil windings is non-circular, and
wherein, in a motor efficiency map of the electric motor with a non-circular cross-sectional coil windings having an inner diameter of a copper wire in each of the coil windings with a width of 1.4 mm and a thickness of 0.5 mm, an area of a high efficiency region is where the motor efficiency is greater than or equal to 80%.

14. The handheld power tool of claim 13, wherein the cross-section of each of the plurality of coil windings comprises at least one of a rectangle, an ellipse, or a gradient shape.

15. The handheld power tool of claim 13, wherein a cross-sectional area of each of the plurality of coil windings is configured to be less than or equal to 5 mm$^2$.

* * * * *